Dec. 7, 1971     A. FISCHER ET AL     3,624,981
JOINING SYSTEM FOR WALL ELEMENTS
Filed Sept. 9, 1969
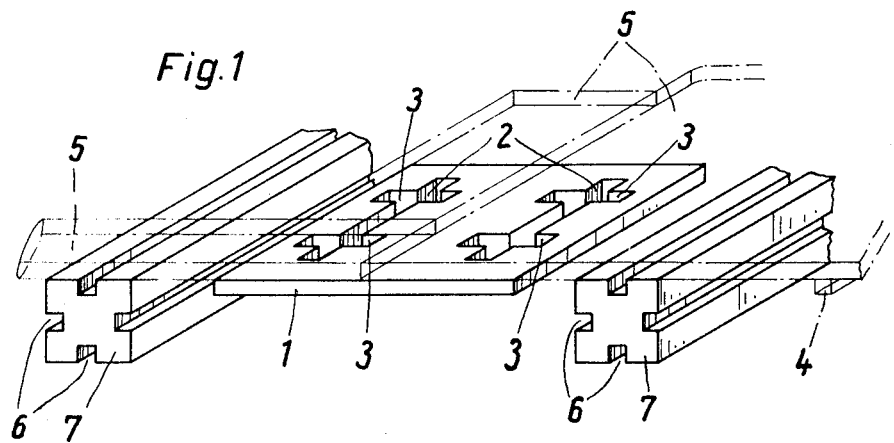
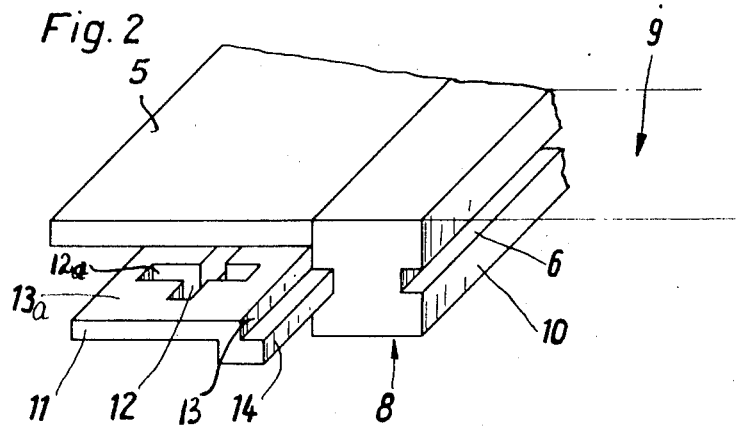
Inventors:
ARTUR FISCHER
SIEGFRIED MROWKA
By: *Michael S. Striker*
*Attorney*

United States Patent Office 3,624,981
Patented Dec. 7, 1971

3,624,981
JOINING SYSTEM FOR WALL ELEMENTS
Artur Fischer, Altheimer Strasse 219, Tumlingen, Germany, and Siegfried Mrowka, Sulz Neckar, Germany; said Mrowka assignor to said Fischer
Filed Sept. 9, 1969, Ser. No. 856,350
Claims priority, application Germany, Sept. 10, 1968, P 17 84 713.1
Int. Cl. E04b 1/60
U.S. Cl. 52—460     5 Claims

ABSTRACT OF THE DISCLOSURE

Structural elements for erecting wall structures have exposed faces provided with first grooves. Cladding plates for cladding the wall structures have projections which are receivable in the grooves of the structural elements. Connecting elements for connecting adjacent ones of the cladding plates are provided with a plurality of grooves at least two of which extend crosswise of one another and which are all dimensioned to receive projections of the cladding plates.

BACKGROUND OF THE INVENTION

The present invention relates generally to erecting systems.

It is known to provide structural elements having exposed faces which are provided with grooves. Cladding plates are also a part of such erecting systems for the purpose of cladding structures erected with the structural elements, for instance to conceal the joints between these elements. These cladding plates are provided with projections receivable in the grooves provided on the structural elements, whereby the cladding plates are connected to the structural elements. However, if the structural elements have only a single such groove in any one exposed surface, it is evidently not possible to connect to one and the same structural element two cladding plates which may happen to abut on the particular exposed surface of the structural element. This means that such abutment then usually takes place in the gap between two adjacent structural elements, and that the cladding plates are not connected with one another in the area of abutment. This, however, is frequently desirable to provide better structural stability, especially if adjacent ones of the structural elements are spaced apart by a relatively significant distance. Otherwise the cladding plates are insufficiently supported in the region of their abutment.

Furthermore, the grooves on the structural elements usually extend in one and the same direction, that is on adjacent structural elements the grooves are parallel with one another. Accordingly, the projections on the cladding plates extend lengthwise of the grooves and the cladding plates must be arranged with reference to the structural elements in such a manner that this lengthwise conformance of the projections to the grooves is maintained. However, there are applications where it is desirable that the cladding plate extend in such a manner that the projections extend transversely to the elongation of the grooves, rather than lengthwise thereof.

None of these problems have been solved with the existing erecting systems.

SUMMARY OF THE INVENTION

It is, accordingly, an object of the present invention to overcome these disadvantages.

More particularly it is an object of the present invention to provide an erecting system which is not possessed of these disadvantages.

A further object of the invention is to provide such an erecting system wherein the cladding plates may be connected with one another, irrespective of the position and orientation of the grooves on the structural elements.

In pursuance of the above objects, and others which will become apparent hereafter, one feature of the invention resides in an erecting system which, briefly stated, comprises a plurality of structural elements for erecting wall structures and the like and which have exposed faces provided with first grooves. Cladding plates are provided for overlying one side of wall structures erected with these structural elements so as to conceal the junctures between adjacent ones thereof. These cladding plates have projections some of which are matingly receivable in corresponding ones of these first grooves. In accordance with the invention we further provide connecting elements for connecting adjacent ones of the cladding plates, and these connecting elements are provided with a plurality of second grooves at least two of which extend crosswise of one another and all of which are dimensioned for matingly receiving respective ones of these projections.

By resorting to our invention a connection between abutting cladding plates can now be established intermediate and without the aid of adjacent structural elements. Furthermore, two or more cladding plates may be arranged at an angle to one another if desired.

While the present invention has general applicability in erecting systems, for instance prefabricated building structures, it can also be utilized to advantage in toy erecting kits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic perspective view of one embodiment of the invention, with cladding plates being shown in phantom lines; and FIG. 2 is a perspective view illustrating a further embodiment of the invention.

DESCRIPTION OF THE PREFERRED EMBODIMENTS

Discussing firstly the embodiment illustrated in FIG. 1, it will be seen that reference numeral 1 identifies a connecting element which in this embodiment is of plate-shaped configuration and provided with two grooves or cut-outs 2 which extend in parallelism with one another. There are provided four additional grooves or cut-outs 3, two of which are associated with one of the grooves 2 and two of which are associated with the other groove 2. Each of the grooves 3 crosses and intersects the associated groove 2 at right angles, as clearly shown. The grooves 3 are shorter than the grooves 2, as also shown.

There are illustrated in phantom lines three cladding plates 5 of different dimensions and orientation. These cladding plates 5 are provided with projections 4 some of which are received in the grooves 2 and 3 of the connecting element 1, whereby these cladding plates 5 may be connected with one another in differing relative orientation. Via additional ones of the projections 4 the cladding plates 5 are connected with structural elements 7 which are clearly illustrated and which will be seen to be provided in some or all of their exposed surfaces with grooves 6 capable of accommodating the projections 4.

While the connecting element 1 in FIG. 1 is shown as being of plate-shaped configuration, it should be understood that other configurations may be chosen. Similarly, grooves 2 and 3 need not extend all the way through the connecting element 1 from one to the other major surface thereof as shown in FIG. 1; instead, they could extend inwardly from one of the major surfaces but terminate short of the other major surface. Also, more than two of the grooves 3 may be associated with each of the grooves 2, and they need not necessarily extend at right angles to the elongation of the grooves 2. Furthermore, a single groove 2 with two or more of the grooves 3 may be provided, instead of two parallel grooves 2 with their associated grooves 3. However, the construction of the connecting element illustrated in FIG. 1 is particularly advantageous because it is especially versatile, permitting a wide range of connections between different cladding plates, different both as to the number of cladding plates which can be connected and as to the dimensions and orientation of the cladding plates.

The embodiment in FIG. 2 shows a structural element 8 provided in two of its lateral exposed surface with the grooves 6. The surfaces are identified with reference numeral 10. In the two opposite surfaces which extend at right angles to the surfaces 10, no grooves 6 are provided. This is not a part of the present invention, but is shown and explained to indicate that it is desired that one of the opposite surfaces, that is one of the ones which are not provided with the grooves 6, constitute a part of an exposed outer side of a wall or other structure to be erected with the erecting system. This outer side is to be as uninterrupted as possible. Its general plane is identified by the arrow 9.

Here, the cladding plate 5 is to be so arranged that one of its major surfaces is located in the general plane 9, constituting a continuation of the exposed surface of the structural element 8, as illustrated.

To make this possible the connecting element—which is in this embodiment identified with reference numeral 11—is provided on an edge face 13 thereof which connects its two opposite major surfaces, with a coupling projection 14 which can be introduced into the respective grooves 6 of the structural element 8. In accordance with the invention the coupling projection 14 is offset with reference to the major surface 13a—from which the grooves 12, 12a corresponding to the grooves 2 and 3 in FIG. 1 extend inwardly—by a distance corresponding to the distance between the groove 6 and the surface of the structural element 8 which is coincident with the plane 9, less the thickness of the cladding plate 5. Projections provided on the cladding plate 5 may then extend into the grooves 12, 12' so that the cladding plate 5 is secured to the connecting element 11 and is located with its exposed major surface in the plane 9 which is thus the general plane of the wall structure.

With the embodiment illustrated in FIG. 2 one particular advantage which is obtained is the fact that—especially where a toy erecting set is involved—the relationship of the basic structural elements to one another is still visible even after the cladding plates are applied. This is often desirable for demonstration and teaching purposes. Also, if the structural elements of the cladding plates are of different colors, an aesthetically desirable or pleasing mix of different colors may be provided at the exposed surface of the erected structure. This is of course true generally and not only if the invention is utilized in a toy erecting set.

It will be understood that each of the elements described above, or two or more together, may also find a useful application in other types of construction differing from the types described above.

While the invention has been illustrated and described as embodied in an erecting system, it is not intended to be limited to the detail shown, since various modifications and structural changes may be made without departing in any way from the spirit of the present invention.

We claim:

1. An erecting system, comprising a plurality of structural elements having exposed faces provided with first grooves; cladding plates for overlying some of said exposed faces and provided with projections receivable in said first grooves; and connecting elements provided for connecting adjacent ones of said cladding plates and being provided with second grooves dimensioned to mate with said projections in connecting relationship and at least two of which second grooves cross and intersect one another, whereby said cladding plates may be connected with one another by said connecting elements in differing relative orientation.

2. A system as defined in claim 1, wherein said second grooves comprise two longitudinal grooves extending transversely spaced and in at least substantial parallelism with one another, and at least two transverse grooves extending crosswise to said longitudinal grooves and intersecting the same at right angles.

3. A system as defined in claim 1, wherein said connecting elements are plate-shaped and each have two major surfaces, and wherein said second grooves extend through the respective connecting elements from one to the other of the respective major surfaces.

4. An erecting system, comprising at least two transversely spaced structural elements having respective first surfaces in two spaced parallel planes, and respective second surfaces located in a common plane normal to said parallel planes; a first groove provided in each of said first surfaces spaced from and extending in parallelism with said common plane; at least one cladding plate having a first surface located at least substantially in said common plane, and an opposite second surface provided with projecting means; at least one connecting element adjacent said second surface and having a plurality of edge faces at least one of which is provided with a coupling projection receivable in one of said first grooves; and at least two second grooves extending crosswise of each other provided in said connecting element and dimensioned to receive said projecting means, whereby said cladding plates may be connected with one another by said connecting elements in differing relative orientation.

5. A system as defined in claim 4, said connecting element having a first and a second major surface which respectively face toward and away from said cladding plate, and said first grooves being spaced from said common plane by a predetermined distance; and wherein said coupling projection is offset in direction away from said first major surface by a distance which corresponds to said predetermined distance less the spacing between said first and second major surfaces.

References Cited

UNITED STATES PATENTS

| | | | |
|---|---|---|---|
| 1,063,317 | 6/1913 | Bartels | 52—459 |
| 1,710,610 | 4/1929 | Duke | 52—582 X |
| 2,736,405 | 2/1956 | Hovey | 287—189.36 D X |
| 3,002,591 | 10/1961 | Hess | 287—189.36 D X |
| 3,241,276 | 3/1966 | Vance et al. | 52—434 X |

PRICE C. FAW, JR., Primary Examiner

U.S. Cl. X.R.

52—483, 582; 287—189.36 D